A. C. TAYLOR.
METHOD OF ELECTRIC RESISTANCE WELDING.
APPLICATION FILED MAR. 11, 1922.
1,435,996.
Patented Nov. 21, 1922.
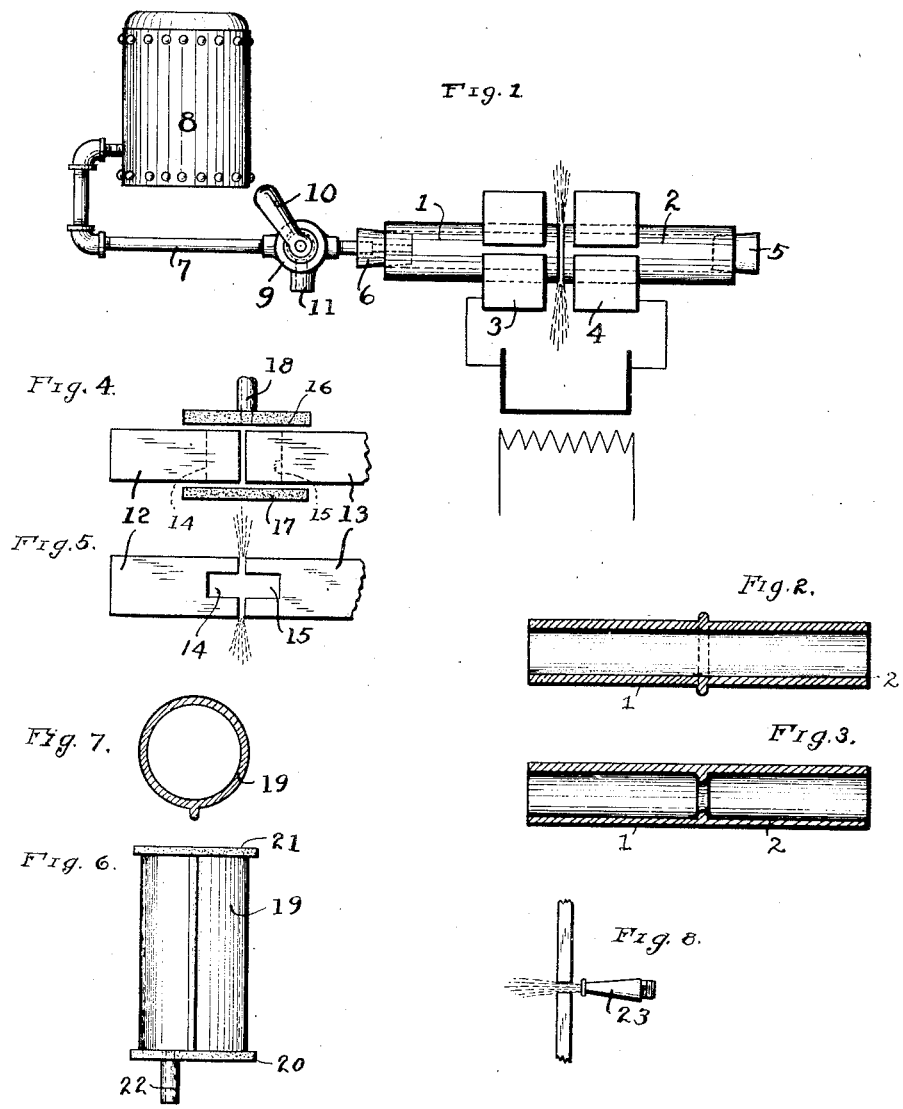
Inventor
ALBERTIS C. TAYLOR.

Patented Nov. 21, 1922.

1,435,996

UNITED STATES PATENT OFFICE.

ALBERTIS C. TAYLOR, OF WARREN, OHIO.

METHOD OF ELECTRIC RESISTANCE WELDING.

Application filed March 11, 1922. Serial No. 542,877.

*To all whom it may concern:*

Be it known that I, ALBERTIS C. TAYLOR, a citizen of the United States, residing at Warren, in the county of Trumbull and State of Ohio, have invented certain new and useful Improvements in a Method of Electric Resistance Welding, of which the following is a specification.

This invention relates to improvements in electric resistance welding and is particularly directed to a method of welding tubing, tanks and other hollow ware, rings or other parts to be united edge to edge.

In welding pipe and hollow ware the flash or upset in a good many cases interferes with the flow of liquids or gas and reduces the carrying capacity of the parts welded. The removal of the flash adds materially to the cost of manufacture and furthermore, the weld is often so located that it is impossible to remove the flash.

It is the object of this invention to provide an economical and efficient method of controlling the flash or upset of the weld so that it may be caused to form only on the desired side of the joint.

In the annexed drawings forming a part of this specification.

Fig. 1 is a diagrammatic view showing the application of the improved method to the welding of tube sections.

Fig. 2 is a longitudinal section through a piece of tubing having a welded joint, the flash of which is on the outside.

Fig. 3 is a longitudinal section through a piece of tubing having a welded joint, the flash of which is on the inside.

Figs. 4 and 5 show an application of the improved method in the welding of two rods, end to end.

Fig. 6 shows an application of the method in the welding of the longitudinal seam of a pipe or other hollow member.

Fig. 7 is a transverse section through a cylindrical member showing the flash of the longitudinal weld on the outside.

Fig. 8 is a view showing an application of the method in the welding of flat work edge to edge.

In the welding of sections of tubing end to end as illustrated in Fig. 1, the tube sections 1 and 2 are clamped between electrodes 3 and 4, of a welding machine. The outer end of the section 2 is closed by a suitable plug 5. Fitting in the outer end of the section 1 is a nozzle 6 on the end of a conduit 7 leading from a tank 8 which may contain air or other gas under a pressure either greater or less than atmospheric pressure. A two way valve 9 having a handle 10 is provided in the conduit 7 by means of which communication may be established between the interior of the tubing and the tank 8 or between the interior of the tubing and the atmosphere through the nipple 11.

When it is desired to form the flash on the exterior of the tubing as shown in Fig. 2, the valve 9 is set to open the passage through the conduit 7 from the tank 8 to the interior of the tubing. The tubes 1 and 2 are moved into contact to establish a flow of current across the meeting edges and then slightly apart to establish an arc beween the ends thereof by means of which the ends are heated to welding temperature. The air or other gas flowing under pressure from the tank 8 escapes through the narrow space between the adjoining ends of the pipes 1 and 2 across which the arc is passing. As the metal at the extreme ends of the tubes 1 and 2 softens under the heat of the arc it tends to flow outwardly with the air current. When the ends have been heated to welding temperature by the arc the tubes 1 and 2 are pressed together under pressure and the valve handle 10 is turned to establish communication between the interior of the tubing and the atmosphere through the nipple 11 whereby the internal pressure is relieved. As the tubes 1 and 2 are pressed together to form the weld the metal will continue to flow outwardly forming the flash entirely on the outside of the tubing. The welding current may be turned off simultaneously with the application of pressure or allowed to continue during a portion of the actual welding operation as well understood in the art.

When it is desired to throw the flash to the inside of the tube, a partial vacuum will be produced in the tube 2 whereby air will be drawn into the tubing through the narrow space between the tube ends when communication is established between the tubing and tank. Otherwise, the operation is exactly the same as described above.

For welding rods end to end as shown in Figs. 4 and 5, the rods 12 and 13 will be provided with registering notches 14 and 15 across the ends to be joined. The open ends of the notches are closed by pieces of asbestos board 16 and 17, the board 16 being upon the end of a pipe 18 connected with a suitable air exhausting or pressure creating means such, for instance, as shown in Fig. 1. Air is forced in through the pipe 18 to the internal chamber formed by notches 14 and 15 and boards 16 and 17 or is exhausted therefrom to throw the flash in or out as desired. The welding is performed exactly as described above in connection with the tubing.

For welding the side seam of a cylinder or other hollow member 19 as shown in Figs. 6 and 7, asbestos board closure members 20 and 21 are applied to the ends of the tube. The closure member 20 is mounted on a pipe 22 through which air can be forced into or exhausted from the hollow member 19. The welding operation is performed as above described and the flash can be thrown outwardly as shown in Fig. 7 by admitting air under pressure through the pipe 22 to the member 19 during the arcing period or may be thrown inwardly by exhausting the air from the member 19 during the arcing period.

In welding abutting ends of flat pieces as shown in Fig. 8 a nozzle 23, having a wide narrow outlet the width of the pieces being joined, and connected to a source of air or other gas under pressure may be employed. The nozzle 23 may be presented to either side of the work to force the flash to either side thereof.

On articles where the inside does not require a smooth surface, I prefer to form the flash on the inside which will practically eliminate the operation of grinding off the flash on the outside and the increased amount of metal forced on the inside will help to strengthen the weld making the joint the strongest part of the object.

What I claim is:

1. The method of electric welding, which consists in bringing the parts to be joined into contact, establishing an arc between said parts to heat the same, passing a current of gas through the arc, and applying pressure to weld said parts together.

2. The method of electric welding, which consists in bringing the parts to be joined into contact, establishing an arc between said parts to heat the same to a welding temperature, passing a current of air through the arc, and applying pressure to weld said parts together.

3. The method of electric welding, which consists in bringing the parts to be joined into contact, establishing an arc between said parts to heat the same to a welding temperature, passing a current of air through the arc, applying pressure to weld said parts together, and cutting off said air current prior to the completion of the weld.

4. The method of welding sections of metal pipe or other hollow metallic articles, which consists in bringing the ends to be joined into contacts establishing an arc between said parts to heat the same to a welding temperature, creating an air current through the arc, applying pressure to weld said ends together and relieving the pressure upon the joint prior to the completion of the weld.

5. The method of electric welding, which consists in bringing the parts to be joined into contact, establishing an arc between said parts to heat the same, passing a current of gas through the arc, discontinuing that gas flow, and applying pressure to weld said parts together.

6. A method of flash welding, comprising the step of passing air or gas through the welding zone concurrently with the making of the flash to divert and build up the flash in a predetermined direction.

In testimony whereof I affix my signature to the specification.

ALBERTIS C. TAYLOR.